(12) United States Patent
Lesperance et al.

(10) Patent No.: US 12,036,896 B2
(45) Date of Patent: Jul. 16, 2024

(54) STRIKER LOCKING LATCH ASSEMBLY INCORPORATING A CINCHING CAM AND HOOK FOR COMPRESSING THE STRIKER AGAINST OUTER SUPPORT PLATES

(71) Applicant: BAE Industries, Inc., Auburn Hills, MI (US)

(72) Inventors: Paul Dennis Lesperance, Macomb Township, MI (US); David Michael Grable, Rochester Hills, MI (US); Willaim N. A. Pruehs, Waterford, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 259 days.

(21) Appl. No.: 17/519,654

(22) Filed: Nov. 5, 2021

(65) Prior Publication Data
US 2022/0144134 A1 May 12, 2022

Related U.S. Application Data

(60) Provisional application No. 63/111,169, filed on Nov. 9, 2020.

(51) Int. Cl.
*B60N 2/005* (2006.01)

(52) U.S. Cl.
CPC .................. *B60N 2/005* (2013.01)

(58) Field of Classification Search
CPC ..... B60N 2/005; B60N 2/01583; E05B 77/36; E05B 85/26; E05B 85/243; E05B 2015/0448; E05B 2015/0486; E05C 3/24

USPC ....................... 297/378.12, 378.13
See application file for complete search history.

(56) References Cited

U.S. PATENT DOCUMENTS

| | | | |
|---|---|---|---|
| 3,188,126 A | 6/1965 | Krause | |
| 4,988,134 A | 1/1991 | Vidwans et al. | |
| 5,975,596 A * | 11/1999 | Rogers, Jr. | E05B 85/243 |
| | | | 292/216 |
| 6,213,525 B1 | 4/2001 | Nicola | |
| 7,762,605 B2 | 7/2010 | Otsuka et al. | |
| 7,954,898 B2 | 6/2011 | Van De Geer et al. | |
| 8,029,030 B2 | 10/2011 | Shimura et al. | |
| 8,128,135 B2 | 3/2012 | Maeta et al. | |
| 8,851,548 B2 | 10/2014 | Pacolt | |
| 9,987,956 B2 | 6/2018 | Vedder et al. | |
| 10,024,083 B2 | 7/2018 | Bejune et al. | |
| 10,358,071 B2 | 7/2019 | Rapedius et al. | |
| 10,500,983 B2 * | 12/2019 | Mueller | B60N 2/366 |
| 10,767,397 B2 | 9/2020 | Ottino et al. | |

(Continued)

*Primary Examiner* — Christine M Mills
*Assistant Examiner* — Yahya Sidky
(74) *Attorney, Agent, or Firm* — Dinsmore & Shohl LLP (57) ABSTRACT

A striker engaging latch including a mounting bracket and a pivotally supported hook. A cinching cam has a cam locking surface profile which extends along an arc radially offset from a center point of rotation of the cam and contacting the hook. A biasing component influences the cinching cam against the hook and into engagement with the striker. A structural cam overlaps the cinching cam. Releasing of the hook from the striker being preceded by the structural cam pivoted into engagement with the cinching cam, with continued collective pivotal actuation of the structural cam and cinching cam allowing the hook to pivot out of contact with the striker.

17 Claims, 7 Drawing Sheets

(56) References Cited

U.S. PATENT DOCUMENTS

| | | |
|---|---|---|
| 11,117,494 B2 | 9/2021 | Vedder et al. |
| 2005/0121922 A1 | 6/2005 | Cetnar et al. |
| 2005/0269854 A1 | 12/2005 | Lutzka et al. |
| 2006/0125273 A1* | 6/2006 | Lutzka ............... B60N 2/01583 |
| | | 296/65.03 |
| 2008/0211281 A1* | 9/2008 | Grable .................. B60N 2/305 |
| | | 297/331 |
| 2011/0210568 A1 | 9/2011 | Williams |
| 2016/0001678 A1* | 1/2016 | Handl .................... B60N 2/366 |
| | | 297/463.1 |
| 2016/0245000 A1 | 8/2016 | Ottino et al. |
| 2020/0165844 A1* | 5/2020 | Ottino .................... E05B 81/06 |

\* cited by examiner

FIG. 12

STRIKER LOCKING LATCH ASSEMBLY INCORPORATING A CINCHING CAM AND HOOK FOR COMPRESSING THE STRIKER AGAINST OUTER SUPPORT PLATES

CROSS REFERENCE TO RELATED APPLICATIONS

The present application claims the priority of U.S. Ser. No. 63/111,169 filed Nov. 9, 2020.

FIELD OF THE INVENTION

The present invention relates generally to a striker locking latch assembly. More specifically, the present invention discloses a cinching cam and hook incorporated into a striker locking latch assembly which compensates for variations in striker diameter, orientation or position and in order to avoid instances of buzz, squeak or rattle in use.

BACKGROUND OF THE INVENTION

The prior art is documented with examples of vehicle seat engagement mechanism in which a suitably configured latch engages a floor or wall mounted striker in order to secure the seat in a use configuration. Striker locking latches are common in the automotive industry and by which the latch must lock tightly onto the striker in order to prevent any striker movement, as any striker movement may create an objectionable buzz, squeak or rattle condition.

A first example of a known vehicle seat latch assembly for use with a vehicle seat pivotally mounted to a vehicle floor for engaging a striker is depicted in US 2005/0269854 to Lutzka et al. Of note, a striker engaging latch plate and an anti-chuck plate are pivotally mounted in overlapping fashion relative to a planar support location. A linkage member is secured to each of the latch plate and anti-chuck plate for pivoting each in opposite directions during disengagement from the striker bar.

Other references of note include U.S. Pat. No. 10,500,983, to Mueller, which teaches a locking unit for a vehicle seat including a pawl which is mounted pivotally about a pivot axis between an open position and a closed position and has a retaining contour for securing a locking pin in the closed position. At least one claw is mounted pivotally about the same pivot axis in a manner offset in the axial direction with respect to the pawl. The claw has a closing contour and the pawl is pivotable from open to closed positions by the closing contour being acted upon by the locking pin.

U.S. Pat. No. 7,044,552, to Muller, teaches another locking mechanism for a vehicle seat, in particular for a motor vehicle seat, having a pivotably mounted pawl for locking to a mating element and having at least one securing element which secures a locked state by interaction with a first functional surface of the pawl, and secures an opened state by interaction with a second functional surface of the pawl. The securing element exerts an opening moment on the pawl in the opened state.

U.S. Pat. No. 3,188,126 to Krause teaches a self-adjusting latch structure having an interlock provided by an elongated striker in a slotted plate. An adjustable locking range is provided which is coincidental with the length of an open slot in the plate and in which the working latches are positioned to have engaging ends moved to a common slot located in a plate to provide interlock.

U.S. Pat. No. 10,024,083 to Bejune et al. teaches a vehicle door latch with inertial lock and including a fork-bolt configured to engage a striker. A lock mechanism disconnects an exterior door handle from the latch mechanism when locked. A lock lever includes a center of mass that is spaced from an axis of rotation whereby the lock lever rotates and locks the latch mechanism in the event of a side impact.

US 2005/0121922 to Cetnar et al. discloses a latch having a releasable cinching mechanism including a housing and a ratchet pivotally mounted to the housing. The ratchet is operable to move between an unlatched position, a secondary latched position, and a primary latched position. A release lever is pivotally mounted to the housing and operatively connects to the ratchet for unlatching the ratchet from either of the secondary or primary latched positions. The operative connection has a guide pin and a cinching lever has a cam surface that slidingly engages the guide pin. The cam surface defines a predetermined path of travel as the cinching lever is drivingly reciprocated in a cinching cycle. The predetermined path enables the cinching lever to be initially out of the path of travel of the ratchet, to engage the ratchet when the ratchet is in the secondary position and drivingly rotating the ratchet to the primary latched position, and thereafter move out of the path of travel of the ratchet. In this fashion, the guide pin moves to urge the cinching lever out of the predetermined path when the release lever is operated in unlatching the latch.

SUMMARY OF THE PRESENT INVENTION

The present invention seeks to overcome many of the disadvantages of the prior art and discloses a striker locking latch assembly which compensates for variations in striker diameter, orientation or position and in order to avoid instances of buzz, squeak or rattle in use. The latch assembly including a mounting bracket and a hook pivotally supported to a first location of the mounting bracket, the hook having a striker receiving surface. A cinching cam is pivotally supported at a second location of the mounting bracket and has a cam locking surface profile which extends along an arc radially offset from a center point of rotation of the cinching cam, the locking surface profile contacting a surface location of the hook.

A first biasing component (such as without limitation a torsional spring) influences the cinching against the hook and, in turn, into engagement with the striker in a first engaged position. A structural cam is pivotally supported to the mounting bracket so as to overlap the cinching cam.

A second biasing component (such as further without limitation a coil extension spring) extends between a pivotally offset location of the structural cam and the hook. Releasing of the hook from the striker is preceded by the structural cam pivoted into engagement with the cinching cam, with continued collective pivotal actuation of the structural cam and cinching cam counter biasing the first biasing component while increasing the bias of the second biasing component to cause the hook to pivot out of contact with the striker. At this point, a user pivots the seat upon which the latch assembly is mounted away from the fixed striker.

Additional features include a cover plate spatially separated from the mounting bracket and supports the first biasing component (again such as a torsional spring), the cover plate sandwiching the hook, cinching cam and structural cam therebetween. A bushing supports the first biasing component against an exterior surface of the cover plate.

The surface location of the hook further includes an edge protuberance, against which is contacted the locking surface profile of the cinching cam. A first rivet extends between the mounting bracket and the cover plate and seats through an interior aperture of the hook.

A second rivet extends between the mounting bracket and the cover plate for rotatably supporting both the cinching cam and the structural cam. A spring rivet secured to the structural cam to define said pivotally offset location. Any of a cable, wire loop or handle is provided to secure to the structural cam for actuating the latch assembly to the second release position.

Other features include the cinching cam being urged in a closing direction by the torsion spring until making contact with the mating surface of the hook, the hook being urged in a closing direction pivotally about the hook pivot until contacting the striker, with a geometry of the cinching cam then creating a locking force through a cam angle defined therein, preventing the striker from urging the hook and, subsequently the cam, in an opening direction and subsequently urging the cinching cam to in an opening direction to the release position. The geometry of the cam angle incorporates multiple tangential arcs which are located eccentrically from each other and eccentric to the cinching cam pivot to create a consistent lock angle and forces necessary to maintain the hook locked against the striker.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a cinching cam and hook incorporated into a striker locking latch assembly which compensates for variations in striker diameter, orientation or position and in order to avoid instances of buzz, squeak or rattle in use. As will be further described, the latch assembly further specifically incorporates an overlapping relationship established between a locking surface of an actuating cinching cam for engaging a rotatable hook in a manner which, along with a unique striker feature incorporated into the hook, which collectively allows for increased angular travel of the cinching cam. The hook can include, without limitation, a plastic over-molding for the striker feature as well as opposing the cinching cam locking surface, and such as which accommodates for greater variance in striker diameter, orientation or position due to production tolerances.

Figure 1:
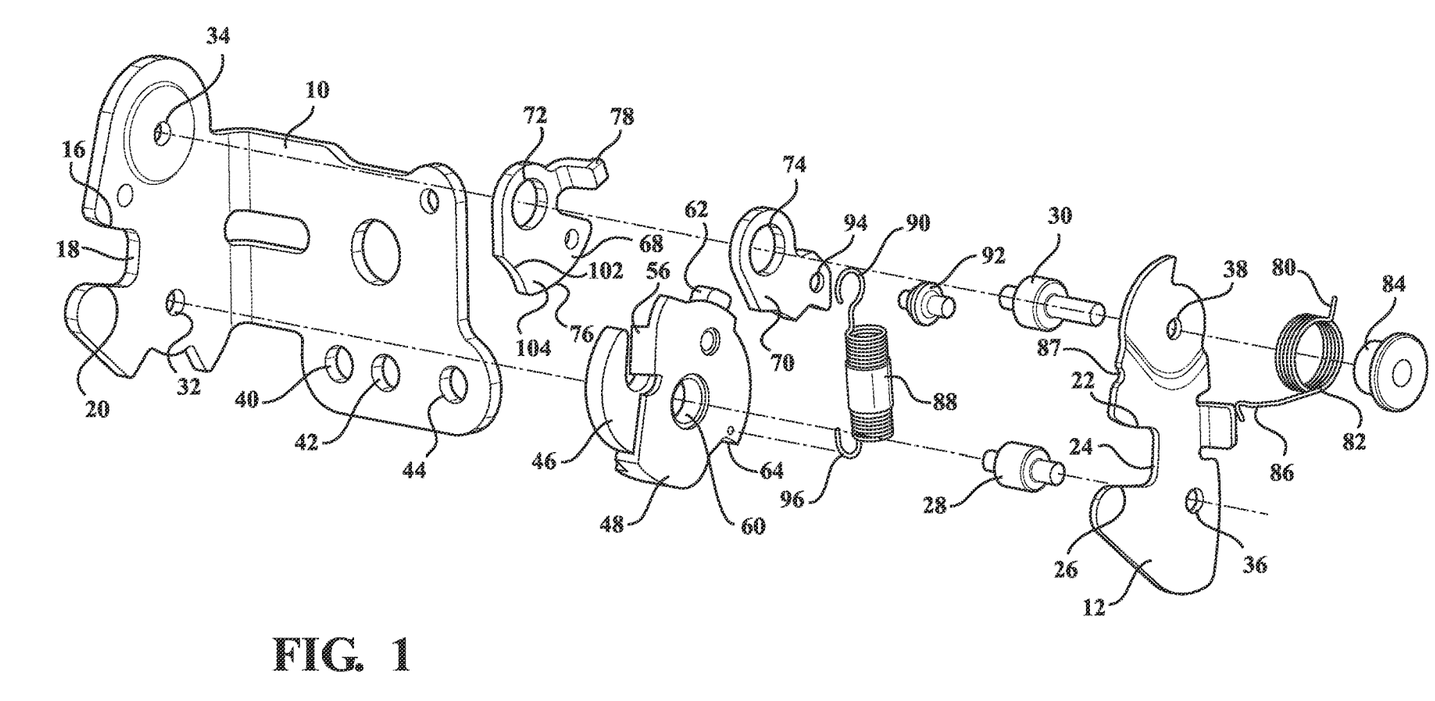
FIG. 1 is an exploded view of the striker locking latch assembly according to a non-limiting embodiment of the present invention.

Referring initially to FIG. 1, an exploded view is shown of the striker locking latch assembly according to a non-limiting embodiment of the present invention and which includes a sandwich arrangement of components (such as which can be constructed of a stamped steel or other suitable material), including each of an innermost mounting bracket 10 and an outermost cover plate 12. Each of the mounting bracket 10 and cover plate 12 further exhibit an arcuate multi-sided recessed profile which receives there between a striker 14 (see FIG. 2 et seq.) which is in turn fixedly mounted to a given location within a vehicle interior (such as further without limitation.

The bracket 10 includes interconnected recess defining surfaces 16, 18 and 20, with the cover plate 12 likewise having recess defining surfaces 22, 24, and 26 which align with the recessed surfaces of the mounting bracket in order to define a pathway for receiving the central extending location of the striker 14. The bracket 10 and cover plate 12 also each include aligning circular aperture locations (each defined by inner extending and closed perimeter surfaces) for receiving a pair of rivets 28 and 30, with mounting bracket 10 including aperture receiving locations 32 and 34 and cover plate 12 aligning aperture receiving locations 36 and 38. The bracket 10 as best shown in FIG. 1 further includes an arrangement of apertures (see for example at 40, 42, 44, et seq.) for mounting the bracket (via bolts or the like) to a desired interior location such as against a seat bottom underside or seat back (not shown), for engaging the striker 14 mounted at a static location within the vehicle (such as without limitation any of a wall or floor location).

Figure 4:
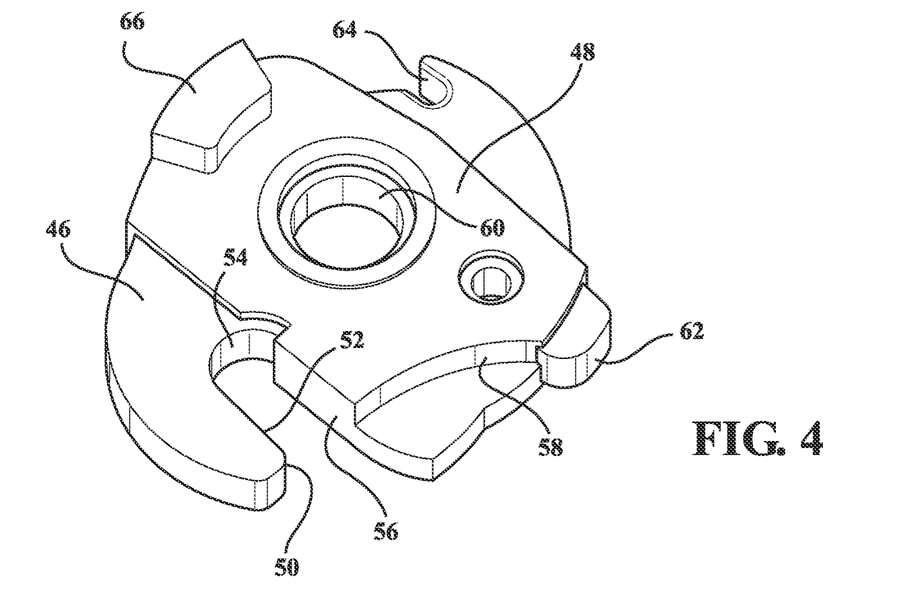
FIG. 4 is an illustration of the hook and illustrating the plastic over-molding which also provides the striker receiving surface.

A hook 46 is provided and which, by non-limiting example, can include a plasticized over mold 48. As best shown in FIG. 4, the hook 46 exhibits a series of configured and recessed interior surfaces (see entranceway location 50, inward extending surface 52 and curved inner surface 54). The plastic over mold further exhibits a striker receiving surface 56 which opposes the inward extending surface 52 and which, upon rotation of the hook, extends within an open area corresponding with the recessed defining surfaces in the bracket 10 and cover plate 12.

The over-molded plastic material upon the hook also includes a recessed edge profile 58 which, as will be subsequently described, opposes an aligning cinching cam locking surface as it travels in pivotally rotating fashion. A central aperture 60 of the hook 46 also receives the rivet 28 as shown in FIG. 1 for rotatably supporting the hook between the apertures 32 and 36 of the bracket 10 and cover plate 12.

An edge protuberance is also shown at 62, which is offset from the central aperture 60 of the hook, and provides an abutment location of the cinching cam locking surface for rotating the hook 46 during rotation of the cinching cam (described below at 68) to influence the hook in its rotary cinching engagement of the striker 14. Other features include a recessed notch location 64 which, as will be further described, is engaged by an end of an extension spring. A further projecting portion 66 of the overmold is depicted and provides lateral support to the hook 46 in combination with the lateral projecting mounting rivet 28 extending through the central aperture 60.

Each of a cinching cam 68 and a structural cam 70 are depicted and provide engagement and release function of the rotating hook 46. The cinching cam 68 includes an interior pivotally supporting aperture 72, with the structural cam 70 having a similar and aligning aperture 74 through which extends the rivet 30 for supporting the cams 68 and 70 in inter-pivotal and overlapping fashion, with opposing ends of the rivet 30 respectively engaging through the aligning aperture receiving locations of the bracket 10 (at 34) and the cover plate (at 38).

Figure 2:
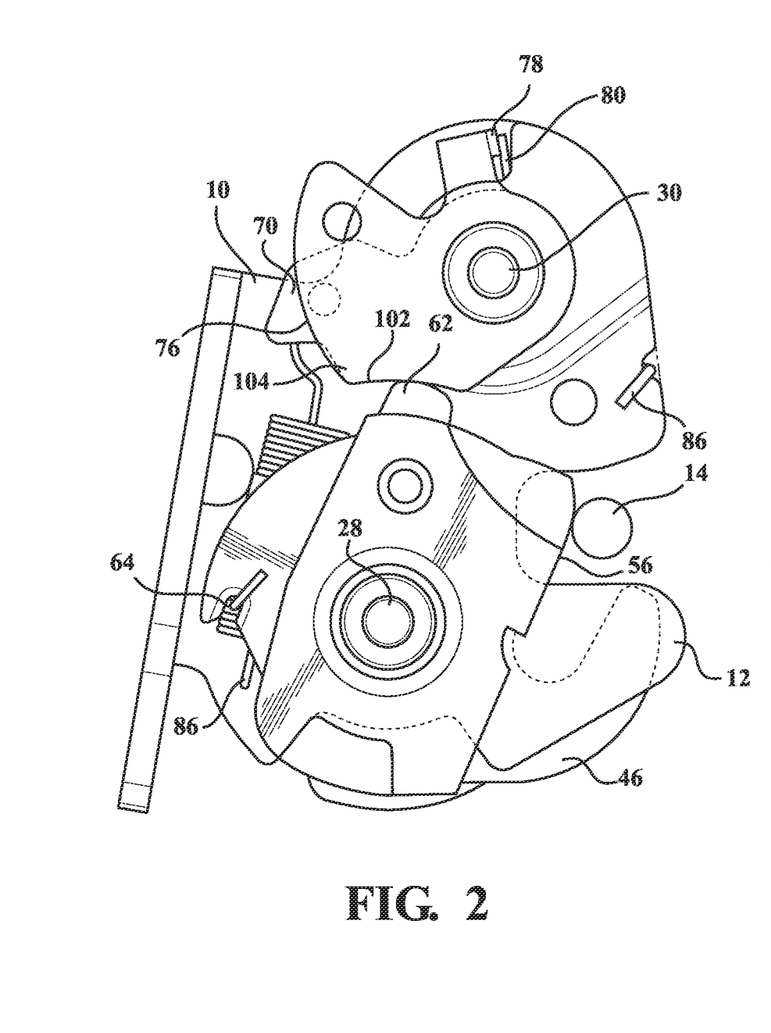
FIG. 2 is a partially transparent view of the latch assembly with the outer cover plate removed and showing the striker receiving surface configured in the rotatable hook.

The cinching cam 68 exhibits an exterior arcing surface 76 (see as best shown in FIG. 2) which is offset from the a center of rotation defined by the aperture 72 and defines a cam locking surface when contacting and pivotally engaging relative the edge protuberant location 62 of the hook 46. FIG. 8A presents a view of the cinching cam 68 and hook 46 only in the striker locked position, and further showing the offset arcing surface 76 having a series of tangential arcs, these shown at 77, 77', 77" et seq., which are located eccentrically from each other as well as eccentric to the second pivotally support supported location (again aperture 34 in the mounting bracket 10) for creating a consistent locking angle and force along the cam locking surface 76 and which are incorporated to reduce the variation in the locking angle created thereby.

A radial extending portion 78 of the cinching cam 68 is depicted and against which is biased a first extending leg or end 80 of a first biasing component in the form of a torsion spring 82. The torsion spring 82 in turn is supported upon an exterior surface of the cover plate 12 and so that a center axis extending through an interior of the torsion spring aligns with the aperture receiving location 38 and is held in place by an attachment bushing 84. A second opposite extending end or leg 86 of the torsion spring 82 engages an edge recess location 87 of the cover plate 12 so that the first extending leg 80 biases the radial portion 78 of the cinching cam 68 in the striker locking (or counter clockwise) direction.

A second biasing component is provided as an extension or coil spring 88 (see again FIG. 1) and includes a first extending and curled end 90 which is engaged by a spring rivet 92, in turn engaging an interior aperture location 94 of the structural cam 70 offset from the pivotally supported aperture 74. A second opposite extending and curled leg 96 of the compression spring 88 engages the recessed notch location 64 configured in the exterior of the hook 46.

Figure 10:
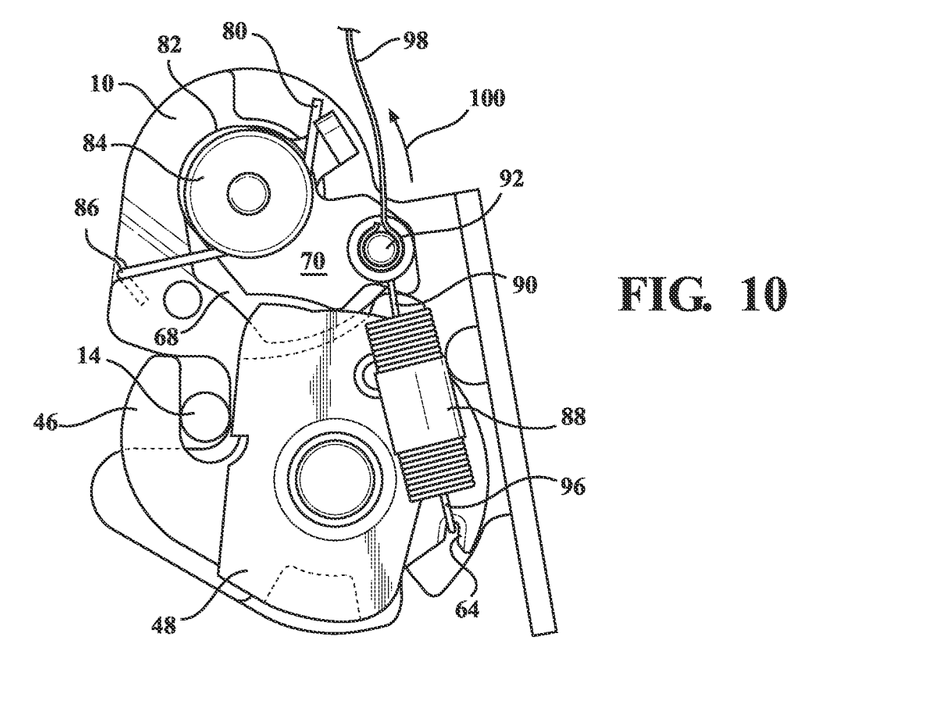
FIG. 10 is a further ninety rotated plan view of the assembled striker latch locking assembly in FIG. 9 in a reversing fashion to that illustrated in FIG. 8.

A release mechanism or tool is provided and can include any of a wire formed loop, cable 98 or other handle mechanism which is connected to the spring rivet 92 and which, upon extending in the direction of arrow 100 as shown in FIG. 10, rotates the structural cam 70 in a counterclockwise direction so that an offset edge location of the structural cam 70 engages the radial extending portion 78 of the cinching cam 68 and, upon continued rotation, rotates the cinching cam in order to counter-bias the first biasing component (torsional spring) 82, simultaneous with tensioning the second biasing component (coil extension spring) 88. Upon the biasing force of the torsional spring 82 being exceeded by the counter bias induced pulling force of the extension (coil) spring 88, the hook 46 is pivoted in a reverse striker release direction in a similar counter-clockwise direction as depicted in the orientation of FIG. 10 at which point, and upon releasing the striker 14, the hook and related components can be pivoted out of contact with the striker.

In operation, the cinching cam 68 is mounted pivotally about the cam pivot 30 and is urged in a closing direction by the first (torsion) spring 82 until making contact with the mating surface of the hook 46 (see again protrusion 62 and communicating recessed surface 58). From the force introduced rotationally by the cinching cam 68, the hook 46 is then urged in a closing direction pivotally about the hook pivot 28 until contacting the striker 14 in a re-engagement condition. The second (coil) spring 88 operates to influence the hook 46 to an open position away from the striker 14 and, when opened, maintains the hook in the open position so that it is ready to receive the striker 14 upon re-latching, as well as to return the structural cam 70 to a locked position.

Without limitation, alternate envisioned variants can operate with the use of a single biasing component (again including but not limited to the torsional spring 82 defined herein). It is also envisioned that the second biasing component, again shown by extensible spring 88, can be reconfigured or otherwise constructed beyond that shown in order to assist in re-latching the hook against the striker in the engaged position.

As also previously described, the geometry of the cinching cam 68 creates a locking force through the engineered cam angle associated with the exterior locking surface, thereby preventing the striker 14 from urging the hook 46 in an opening direction and subsequently urging the cinching cam 68 in an open direction. The aforementioned engineered cam angle is maintained over a large angular range by the engineered cam locking surface 76 exhibiting the multiple tangential arcs (see again at 77, 77', 77", et seq. in FIG. 8A) located eccentrically from each other and which are eccentric to the cam pivot 30 (again corresponding to the second pivotally supported location of the mounting bracket 10) in a manner to create a consistent lock angle and forces necessary to keep the mechanism locked.

Referring now to FIG. 2, a partially transparent view is shown of the latch assembly with the outer cover plate 12 removed and showing the striker receiving surface configured in the rotatable hook 46. In this position, the cinching cam 68 depicted in a clockwise retracted position and by which the edge protuberance 62 of the hook 46 contacts a further outer surface profile 102 of the cinching cam 68 which interconnects with and succeeds the locking surface 76 at transition location 104.

Figure 3:
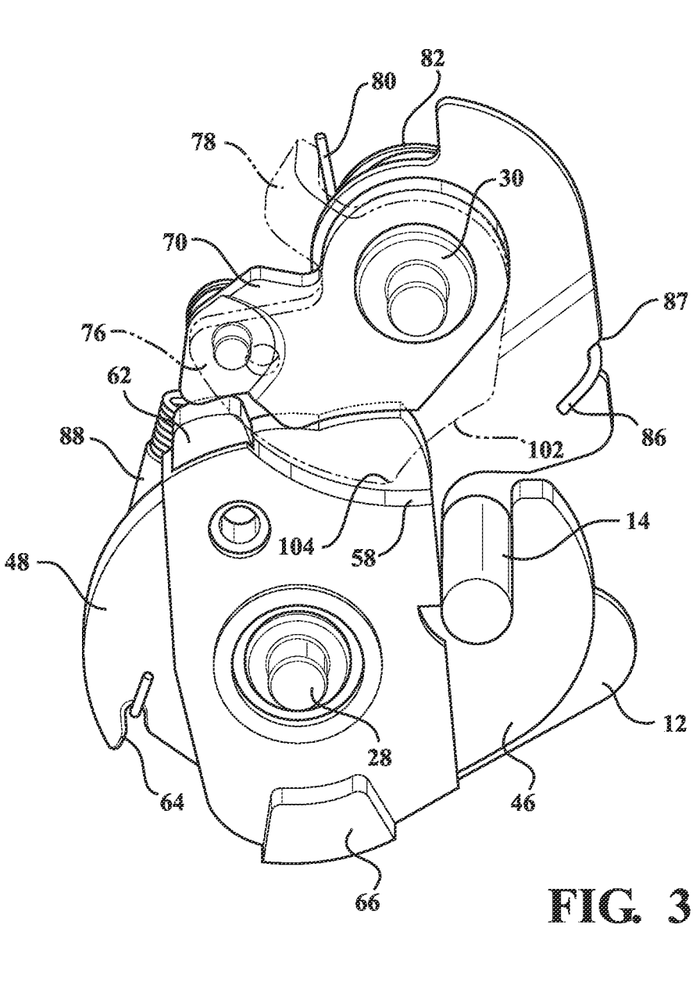
FIG. 3 is a similar illustration to FIG. 2 with the mounting plate also removed and showing axial interaction of the cinching cam locking surface with an over-molded surface of the hook.

FIG. 3 is a similar illustration to FIG. 2 with the mounting plate 10 removed and showing axial interaction of the cinching cam locking surface 76 in the locking direction with the recessed location 58 within the over-molded surface of the hook 46. The cinching cam locking surface 76 simultaneously displaces against the edge protuberance 62

Figures 5, 6, 7:
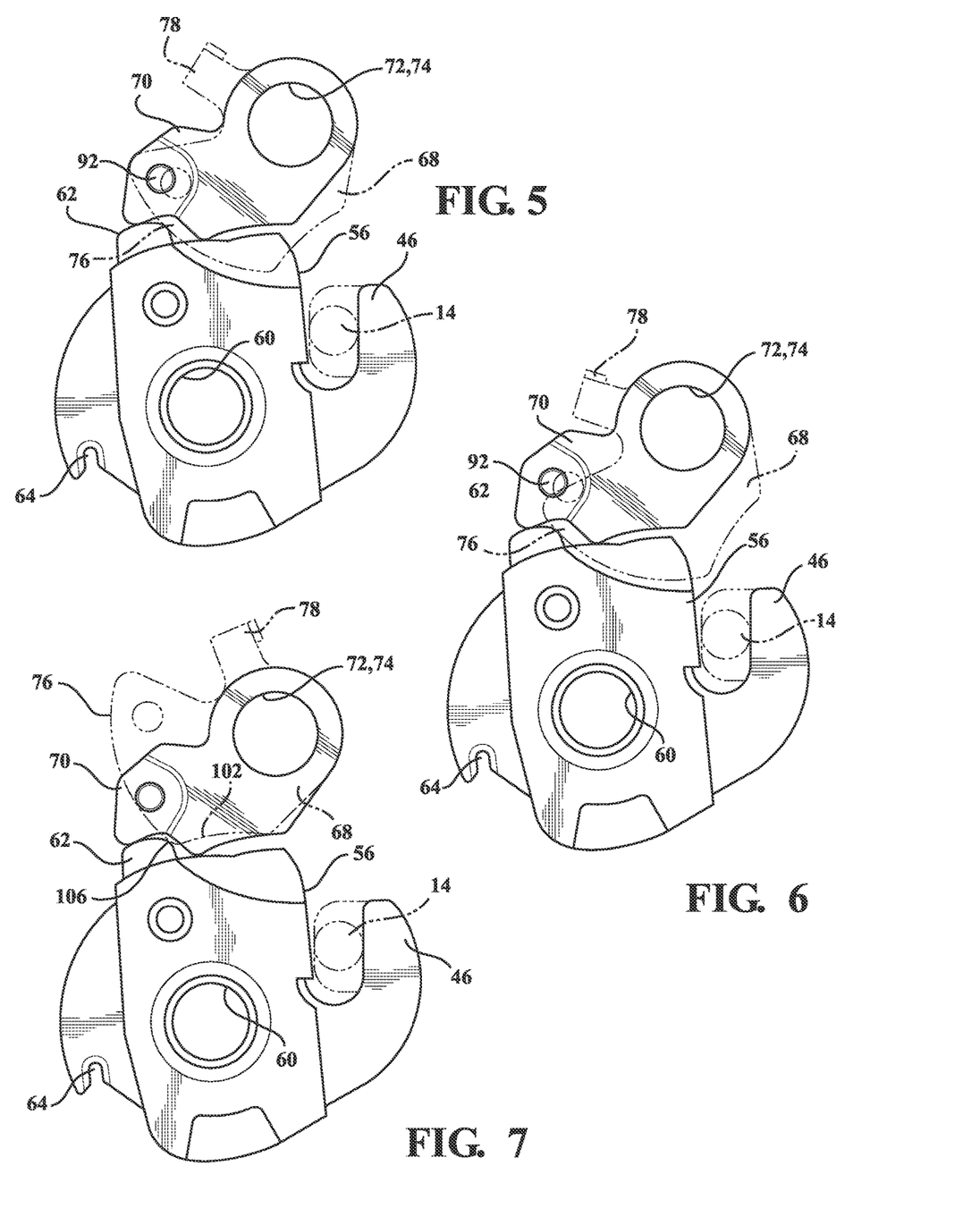
FIGS. 5-7 present a succession of side plan views similar to FIG. 3 and showing a sub-combination of the hook, cinching cam and structural cam in each of nominal design, maximum cinch, and minimal cinch positions, respectively.

FIGS. 5-7 present a succession of side plan views similar to FIG. 3 in each of nominal design (FIG. 5), maximum cinch (FIG. 6), and minimal cinch (FIG. 7) positions, respectively, showing a sub-combination of the hook 46, cinching cam 68 and structural cam 70. As previously indicated, the striker locking latch provides for accommodating striker designs of varying diameter, orientation or position and by which the degree of rotation of the cinching cam 68 is dictated in part by configuration of the striker receiving surface 56 relative to the striker 14 in combination with the displacing profile of the cinching cam locking surface 76 relative to the protuberant edge portion 62 of the hook 46.

In this fashion, the cinching cam 68 in FIG. 6 pivots to a maximum counterclockwise position for cinching the hook 46 for engagement with a smaller striker configuration 14. Reciprocally, the cinching cam 68 in the minimal cinching position of FIG. 7 achieves striker locking at an initial location (at 106) of the locking surface 76 in contact with the protuberant edge location 62 of the hook 46 (this corresponding to larger diameter sized striker).

Figure 8:
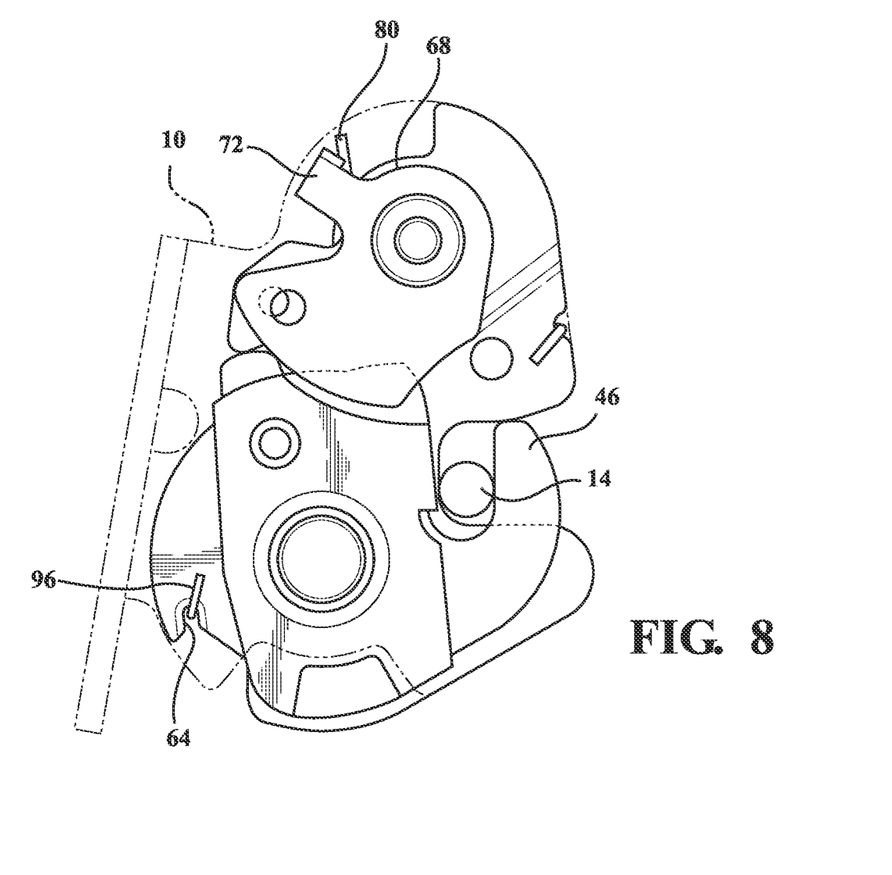
FIG. 8 corresponds to the latch and cinching cam position in FIG. 3 in a plan view representation similar to FIG. 2.
Figure 8A:
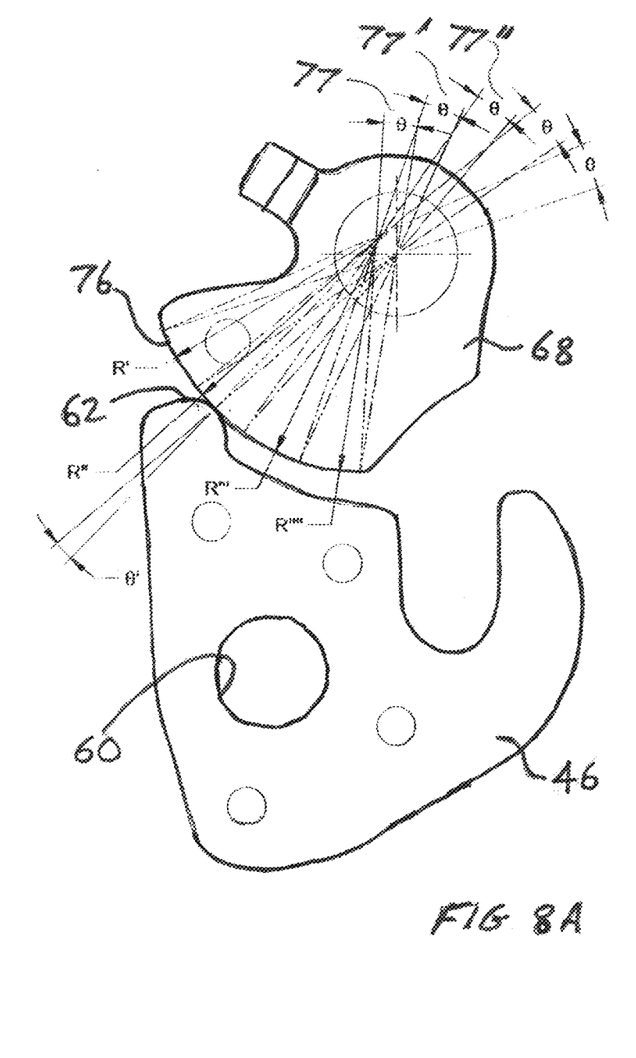
FIG. 8A presents a view of the cinching cam and hook in the striker locked position of FIG. 8 and further showing a series of tangential arcs located eccentrically from each other and eccentric to the second pivotally support supported location in the mounting bracket for creating a consistent locking angle and force along the cam locking surface.
Figure 9:
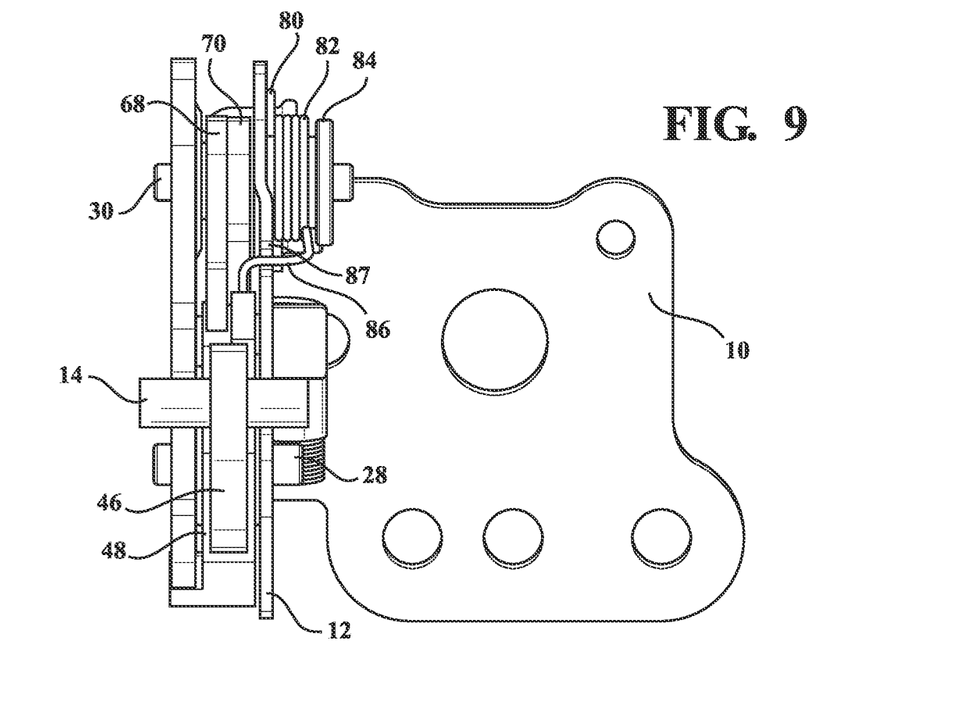
FIG. 9 is a ninety degree rotated side view of the assembled striker latch locking assembly in FIG. 8.

FIG. 8 corresponds to the latch and cinching cam position in FIG. 3 in a plan view representation similar to FIG. 2. FIG. 9 is a ninety degree rotated side view of the assembled striker latch locking assembly in FIG. 8 and FIG. 10 is a further ninety rotated plan view of the assembled striker latch locking assembly in FIG. 9 in a reversing fashion to that illustrated in FIG. 8.

Figure 11:
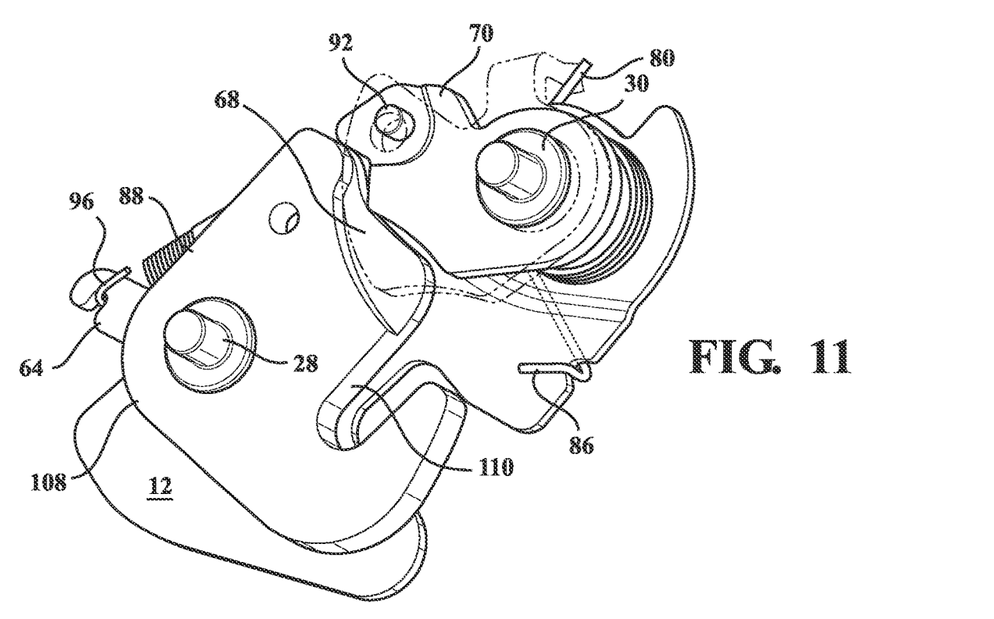
FIG. 11 is a related illustration of a further variant of the striker locking latch illustrating a reconfiguration of a fine blank hook design incorporating the striker receiving feature exhibited by a locally depressing the striker receiving area, along with further machining the receiving surface against which is contacted the cinching cam locking surface.
Figure 12:
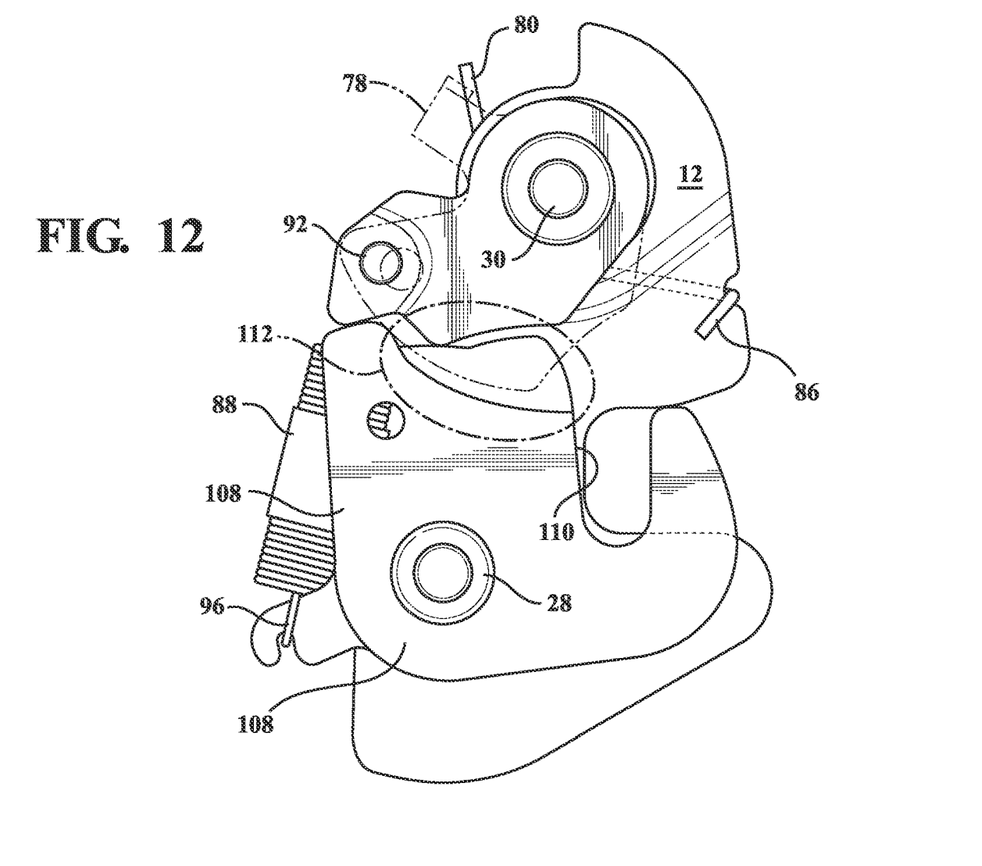
FIG. 12 is a plan view of the variant of FIG. 11 similar to the striker engaged position of FIG. 3 and illustrating the locking surface profile established between the cinching cam and hook.

FIG. 11 is a related illustration of a further variant of the striker locking latch, at 108, illustrating a reconfiguration of a fine blank hook design and incorporating the striker receiving feature, further at 110, exhibited by a locally depressing the striker receiving area, along with further machining the receiving surface against which is contacted the cinching cam locking surface. Finally, FIG. 12 is a plan view of the variant in FIG. 11, similar to the striker engaged position of FIG. 3, and illustrating the locking surface profile (see identified area at 112) established between the cinching cam 68 (depicted in phantom in FIGS. 11-12) and redesigned hook 108. Without limitation, the hook component can alternatively be reconfigured through the addition of a second plate (not shown) that is rotatably affixed thereto.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A striker engaging locking latch assembly, comprising:
   a mounting bracket;
   a hook having a central aperture pivotally supported to a first location of said mounting bracket, said hook having a striker receiving surface and an edge protuberant surface offset from the central aperture outside said striker receiving surface;
   a cinching cam pivotally supported at a second location of said mounting bracket, said cinching having a cam locking surface profile which extends along an arc radially offset from a center point of rotation of said cinching cam, said locking surface profile contacting said edge protuberant surface of said hook;
   a biasing component for influencing said cinching cam against said hook and, in turn, into engagement with the striker in a first engaged position;
   said cam locking surface profile further defining a cam angle incorporating a series of tangential arcs located eccentrically from each other and eccentric to said second pivotally supported location with said mounting bracket to create a consistent locking angle and force with said edge protuberant surface along said cam locking surface to maintain said hook locked against the striker;

a structural cam pivotally supported to said mounting bracket so as to overlap said cinching cam; and upon said structural cam being pivoted into engagement with said cinching cam and against biasing component, continued pivotal actuation of said structural cam and cinching cam allowing said hook to pivot out of contact with the striker in a second release position.

2. The locking latch assembly of claim 1, further comprising a second biasing component extending between a pivotally offset location of said structural cam and said hook for rotating said structural cam to a locked position and maintaining an open position of said hook.

3. The locking latch assembly of claim 1, further comprising a cover plate spatially separated from said mounting bracket and supporting said biasing component, said cover plate sandwiching said hook, cinching cam and structural cam therebetween.

4. The locking latch assembly of claim 3, further comprising a bushing supporting said biasing component against an exterior surface of said cover plate.

5. The locking latch assembly of claim 3, further comprising a first rivet extending between said mounting bracket and said cover plate and seating through an interior aperture of said hook.

6. The locking latch assembly of claim 5, further comprising a second rivet extending between said mounting bracket and said cover plate for rotatably supporting both said cinching cam and said structural cam.

7. The locking latch assembly of claim 1, further comprising a spring rivet secured to said structural cam at said second pivotally supported location to said mounting bracket.

8. The locking latch assembly of claim 7, further comprising any of a cable, wire loop or handle securing to said structural cam for actuating to said second release position.

9. The locking latch assembly of claim 1, said biasing component further comprising a torsional spring.

10. The locking latch assembly of claim 2, said second biasing component further comprising an extension coil spring.

11. The locking latch assembly of claim 9, further comprising said cinching cam being urged in a closing direction by said torsion spring until making contact with the surface location of said hook, said hook being urged in a closing direction pivotally about said hook pivot until contacting the striker, with a geometry of said cinching cam then creating a locking force through said cam angle defined therein, preventing the striker from urging said hook and, subsequently said cam, in an opening direction and subsequently urging said cinching cam to in the opening direction to the release position.

12. The locking latch assembly of claim 1, further comprising a plastic over-mold applied to said hook including said striker receiving surface.

13. The locking latch assembly of claim 12, said over-mold plastic further comprising a recessed edge profile opposing said cinching cam locking surface profile.

14. A striker engaging locking latch assembly which compensates for variations in striker diameter, orientation or position, and in order to avoid instances of buzz, squeak or rattle in use, said latch assembly comprising:

a mounting bracket and a spaced apart cover plate, each having a plurality of recessed and aligning surfaces defining a pathway adapted for receiving a central extending location of the striker;

each of a hook, a cinching cam and a structural cam pivotally supported between said mounting bracket and cover plate;

said hook having a central aperture pivotally supported at a first location of said mounting bracket and including a striker receiving surface and an edge protuberant surface offset from the central aperture outside said striker receiving surface;

said cinching cam pivotally supported at a second location of said mounting bracket and having a cam locking surface profile which extends along an arc radially offset from a center point of rotation of said cinching cam, said locking surface profile contacting said edge protuberant surface of said hook;

a torsional spring influencing said cinching cam against said hook and, in turn, into engagement with the striker in a first engaged position in which said striker receiving surface is aligned between said pathways in said mounting bracket and cover plate;

said cam locking surface profile further defining a cam angle incorporating a series of tangential arcs located eccentrically from each other and eccentric to said second pivotally supported location with said mounting bracket to create a consistent locking angle and force along said cam locking surface to maintain said hook locked against the striker;

said structural cam pivotally supported at a further location of said mounting bracket so as to overlap said cinching cam;

an extensible coil spring extending between a pivotally offset location of said structural cam and said hook; and upon said structural cam being pivoted into engagement with said cinching cam, continued pivotal actuation of said structural cam and cinching cam counter biasing said torsional spring while increasing said bias of said extensible coil spring to cause said hook to pivot out of contact with the striker in a second release position, permitting said hook to be rotated away from the striker.

15. The locking latch assembly of claim 14, further comprising a plastic over-mold applied to said hook including said striker receiving surface.

16. The locking latch assembly of claim 15, said over-mold plastic further comprising a recessed edge profile opposing said cinching cam locking surface profile.

17. The locking latch assembly of claim 14, further comprising a spring rivet secured to said structural cam to define said second pivotally supported location to said mounting bracket, any of a cable, wire loop or handle securing to said structural cam for actuating to said second release position.

* * * * *